(12) United States Patent
Nishio et al.

(10) Patent No.: US 12,451,935 B2
(45) Date of Patent: Oct. 21, 2025

(54) COMMUNICATION APPARATUS AND COMMUNICATION METHOD

(71) Applicant: Panasonic Holdings Corporation, Osaka (JP)

(72) Inventors: Akihiko Nishio, Osaka (JP); Yasuaki Yuda, Kanagawa (JP); Shotaro Maki, Kanagawa (JP)

(73) Assignee: Panasonic Holdings Corporation, Osaka (JP)

( * ) Notice: Subject to any disclaimer, the term of this patent is extended or adjusted under 35 U.S.C. 154(b) by 39 days.

(21) Appl. No.: 18/413,826

(22) Filed: Jan. 16, 2024

(65) Prior Publication Data

US 2024/0267093 A1 Aug. 8, 2024

(30) Foreign Application Priority Data

Feb. 6, 2023 (JP) .................................. 2023-016024

(51) Int. Cl.
*H04B 7/02* (2018.01)
*H04B 7/0417* (2017.01)

(52) U.S. Cl.
CPC .................................. *H04B 7/0417* (2013.01)

(58) Field of Classification Search
CPC .................................................. H04B 7/0417
USPC ................ 375/267, 260, 259, 219, 295, 316
See application file for complete search history.

(56) References Cited

U.S. PATENT DOCUMENTS

| | | | |
|---|---|---|---|
| 2021/0091902 A1 | 3/2021 | Yamada et al. | |
| 2022/0109537 A1* | 4/2022 | Zewail | H04L 5/006 |
| 2022/0141064 A1* | 5/2022 | Horn | H04W 72/23 |
| | | | 370/329 |

FOREIGN PATENT DOCUMENTS

JP 2021044598 A 3/2021

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.3.0, Sep. 2018. (92 pages).
Yamazaki et al., "Proposal for a User-Centric Ran Architecture Towards Beyond 5G," The Institute of Electronics, Information and Communication Engineers, IEICE Technical Report, SAT2021-43, 121(189):4-10, Oct. 2021.

* cited by examiner

*Primary Examiner* — Zewdu A Kassa
(74) *Attorney, Agent, or Firm* — Seed Intellectual Property Law Group LLP

(57) ABSTRACT

A communication apparatus includes control circuitry which, in operation, controls transmission of a reference signal for phase noise compensation in each of a plurality of streams of multiple-input multiple-output (MIMO) transmission in accordance with a condition, and transmission circuitry which, in operation, transmits the reference signal according to the control.

4 Claims, 4 Drawing Sheets

COMMUNICATION APPARATUS AND COMMUNICATION METHOD

BACKGROUND

1. Technical Field

The present disclosure relates to a communication apparatus and a communication method.

2. Background Art

Multiple-input multiple-output (MIMO) transmission is used to improve throughput in cellular wireless communication such as 5G new radio access technology (NR) (See, for example, 3GPP TS 38.300, V15.3.0 "NR; NR and NG-RAN Overall Description; Stage 2 (Release 15)", 2018-09).

SUMMARY

However, there is room for study on a transmission method of a reference signal for compensation of a phase noise.

One non-limiting and exemplary embodiment facilitates providing to providing a communication apparatus and a communication method capable of appropriately transmitting a reference signal for compensation a phase noise.

In one general aspect, the techniques disclosed here feature a communication apparatus including control circuitry which, in operation, controls transmission of a reference signal for phase noise compensation in each of a plurality of streams of multiple-input multiple-output (MIMO) transmission in accordance with a condition, and transmission circuitry which, in operation, transmits the reference signal according to the control.

It should be noted that general or specific embodiments may be implemented as a system, a method, an integrated circuit, a computer program, a storage medium, or any selective combination thereof.

According to a non-limiting and exemplary embodiment of the present disclosure, the reference signal for compensation of the phase noise can be appropriately transmitted.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION OF PREFERRED EMBODIMENTS

Figure 1:
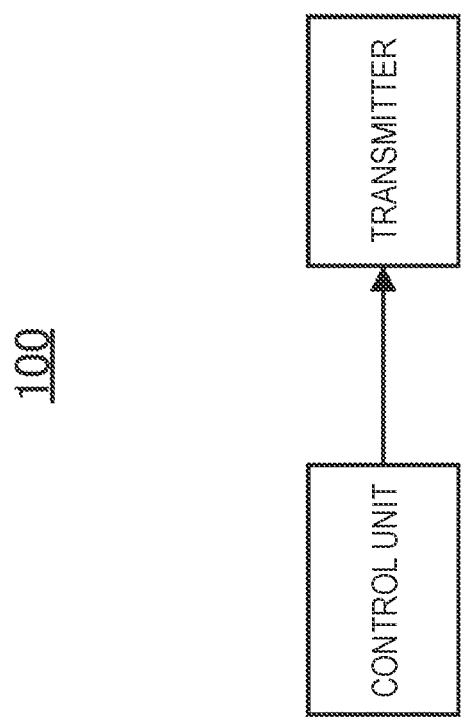
FIG. 1 is a block diagram illustrating a configuration example of a part of a communication apparatus.

Hereinafter, exemplary embodiments of the present disclosure will be described in detail with reference to the drawings.

For a sixth generation mobile communication system (6G system), virtualization of a system such as a "virtualized terminal" or a "virtualized base station" using a plurality of relay apparatuses or wireless antennas disposed in a distributed manner has been studied (see, for example, Kosuke Yamazaki et al., "PROPOSAL FOR A USER-CENTRIC RAN ARCHITECTURE TOWARDS BEYOND 5G", IEICE Technical Report, vol. 121, no. 189, SAT 2021-43, pp. 4-10, October 2021; hereinafter, referred to as NPL 2). Such a virtualization system may be referred to as a "virtualization terminal system" or a "distributed antenna system".

In addition, in the 6G, in addition to a millimeter wave band, utilization of a radio wave having a high frequency such as a terahertz band (or a sub-terahertz band) of 100 GHz or more has been studied. For example, NPL 2 proposes a system using a terahertz wave for communication near a terminal.

In MIMO transmission, a base station (for example, also referred to as a gNB or a gNodeB) and a terminal (for example, also referred to as user equipment (UE)) improve throughput by transmitting and receiving a plurality of data streams by using a plurality of antennas. Since the MIMO transmission is transmission using identical time and frequency resources, a reception-side apparatus performs data stream separation processing (hereinafter, referred to as "MIMO separation processing"). For example, the reception-side apparatus performs the MIMO separation processing by using a channel matrix generated from a channel estimation value.

In a case where the high frequency band such as the millimeter wave and the terahertz wave is used, it is easily influenced by a phase noise generated in a local oscillator. The influence of the phase noise appears as, for example, a common phase error (CPE) or inter-carrier interference (ICI), and may cause deterioration of an error rate. Thus, the reception-side apparatus performs phase noise compensation processing such as CPE compensation or ICI removal in order to reduce the influence of the phase noise. For example, phase tracking reference signals (PTRSs) are used for the phase noise compensation.

For the 6G, although the virtualization system using the high frequency band has been studied, the influence of the phase noise or a frequency offset generated in each of a plurality of wireless antennas on communication performance and a countermeasure therefor have not been sufficiently studied. For example, in a case where independent phase noises are generated in the plurality of wireless antennas on at least one of a transmission side or a reception side, characteristics may deteriorate unless the reference signal for phase noise compensation is appropriately transmitted.

In a non-limiting exemplary embodiment of the present disclosure, for example, a method for transmitting reference signals for phase noise compensation in a case where independent phase noises are generated in a plurality of wireless antennas of at least one of a transmission side or a reception side will be described. For example, a communication apparatus (for example, at least one of a base station or a terminal) may control a transmission method of the PTRS (for example, a generation method of the PTRS or an insertion method of the PTRS) in accordance with a predetermined condition.

[Overview of Communication System]

A communication system according to an exemplary embodiment of the present disclosure includes at least one communication apparatus 100. Communication apparatus 100 may be, for example, a base station or a terminal.

For example, communication apparatus 100 may perform at least one of transmission or reception on signals of radio frequency bands.

FIG. 1 is a block diagram illustrating a configuration example of a part of communication apparatus 100. In communication apparatus 100 illustrated in FIG. 1, a control unit (for example, corresponding to a control circuit) controls transmission of the reference signals for phase noise compensation (for example, PTRSs) in a plurality of streams of multiple-input multiple-output (MIMO) transmission in accordance with a condition. A transmitter (for example, corresponding to a transmission circuit) transmits the reference signal according to the control.

[Configuration Example of Communication Apparatus]

Figure 2:
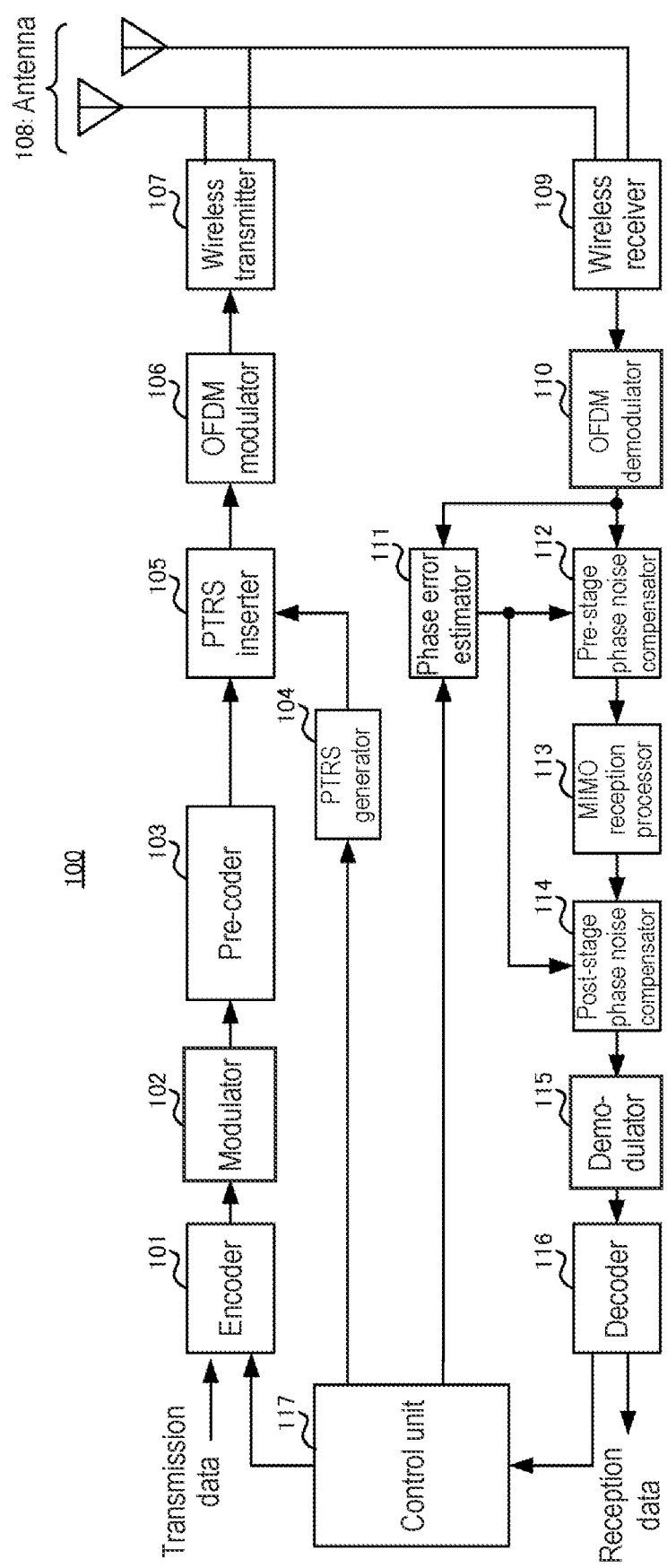
FIG. 2 is a block diagram illustrating a configuration example of the communication apparatus.

FIG. 2 is a block diagram illustrating an example of a configuration of communication apparatus 100 according to the present exemplary embodiment. Communication apparatus 100 illustrated in FIG. 2 may include, for example, encoder 101, modulator 102, precoder 103, PTRS generator 104, PTRS inserter 105, orthogonal frequency division multiplexing (OFDM) modulator 106, wireless transmitter 107, antennas 108, wireless receiver 109, OFDM demodulator 110, phase error estimator 111, pre-stage phase noise compensator 112, MIMO reception processor 113, post-stage phase noise compensator 114, demodulator 115, decoder 116, and control unit 117.

At least one of encoder 101 to OFDM modulator 106 or OFDM demodulator 110 to control unit 117 illustrated in FIG. 2 may be included in the control unit illustrated in FIG. 1. In addition, at least one of wireless transmitter 107 or antennas 108 illustrated in FIG. 2 may be included in the transmitter illustrated in FIG. 1.

<Transmission Processing>

For example, encoder 101 performs error correction coding on a signal by using coding schemes such as turbo coding, low density parity check (LDPC) coding, and polar coding.

For example, modulator 102 maps a coded bit string to an IQ constellation such as quadrature phase shift keying (QPSK) and 16-quadrature amplitude modulation (16 QAM) to generate modulation symbols.

For example, precoder 103 performs precoding processing (for example, weighting processing on the modulation symbols) for MIMO transmission on the modulation symbols input from modulator 102. Note that, in a case where communication apparatus 100 does not perform MIMO transmission, precoder 103 need not perform processing. For example, in a case where the local oscillator is different for each transmission antenna system, if a component of each stream is included in a plurality of transmission antenna systems by precoding, phase compensation accuracy for each stream on the reception side may be deteriorated. Thus, in this case, precoder 103 need not perform precoding (or may perform precoding using a unit matrix or a unitary matrix).

PTRS generator 104 generates reference signals for phase compensation (for example, PTRSs). For example, PTRS generator 104 generates a PTRS for each stream (or for each antenna system) or a PTRS common to the streams (or antenna systems) based on the control from control unit 117. Note that, a generation example of the PTRS will be described later.

PTRS inserter 105 inserts the PTRS generated by PTRS generator 104 into a predetermined subcarrier and/or an OFDM symbol. An insertion position of the PTRS for each stream and an insertion position of the PTRS common to the streams may be defined in advance, may be determined by communication apparatus 100, or may be notified from an apparatus (for example, base station) different from communication apparatus 100.

In addition, for example, the PTRS for each of the plurality of streams may be transmitted from each of the plurality of antennas 108 of communication apparatus 100.

In addition, for example, a PTRS (for example, identical PTRS) common to the plurality of streams may be transmitted from each of the plurality of antennas 108, or may be transmitted from any antenna of the plurality of antennas 108. In addition, for example, in a case where the PTRS is transmitted from any one of the plurality of antennas 108, the PTRS may be transmitted with a transmission power that is a multiple of the number of antennas. Note that, the number of antennas to which the PTRS is transmitted is not limited to one, and may be two or more. In this case, the PTRS may distribute a total transmission power settable in the plurality of antennas 108 to the antennas used for the transmission of the PTRS.

For example, OFDM modulator 106 maps a transmission signal input from precoder 103 to a subcarrier, and converts the transmission signal from a frequency domain signal to a time domain signal by inverse fast Fourier transform (IFFT) processing to generate an OFDM signal. In addition, OFDM modulator 106 adds a cyclic prefix (CP) by copying, to the head, a part of a sample at the end of the OFDM symbol of the signal after the IFFT. At this time, OFDM modulator 106 may perform windowing processing for reducing an out-of-band radiation power due to discontinuity between OFDM symbols. Note that, filtering processing may be performed instead of the windowing processing, or another waveform shaping processing for limiting a frequency band may be performed.

Wireless transmitter 107 performs wireless transmission processing such as digital-to-analog conversion, up-conversion to a transmission frequency using a local oscillator, and signal amplification processing, and transmits the signal after the wireless transmission processing from antenna 108.

Note that, kinds of processing in the units (for example, OFDM modulator 106 and wireless transmitter 107) that perform the transmission processing may be performed for each system of the plurality of antennas. In addition, each antenna system may process transmission signals to different relay terminals (for example, case of the virtualization terminal system) or access points (APs) (for example, case of the distributed antenna system). In addition, processors such as wireless transmitters that perform kinds of processing of the antenna systems may be in an identical housing, or may be disposed in a distributed manner in different housings.

<Reception Processing>

Wireless receiver 109 performs wireless reception processing such as down-conversion using a local oscillator, analog-digital conversion, and a band-limiting filter on a signal received by antennas 108, for example, to obtain a baseband signal.

For example, OFDM demodulator 110 removes CP added to the signal input from wireless receiver 109, performs fast Fourier transform (FFT) processing on the signal from which CP has been removed, and converts the signal from a time domain signal into a frequency domain signal.

Phase error estimator 111 estimates a phase error that changes due to the influence of the phase noise, for example, by using the PTRS included in the signal input from OFDM demodulator 110. The phase error may be, for example, a phase change amount from a phase of a head symbol of a radio slot (or frame) or a phase change amount from a previous symbol. For example, according to an instruction from control unit 117, phase error estimator 111 may estimate, as a phase error to be estimated, any one or both of a phase noise for each reception antenna system and a phase noise for each transmission antenna system. For example, phase error estimator 111 outputs information regarding the phase error due to the phase noise for each reception antenna system to pre-stage phase noise compensator 112, and outputs information regarding a phase error due to the phase noise for each transmission antenna system to post-stage phase noise compensator 114.

For example, pre-stage phase noise compensator 112 performs phase noise compensation processing for each reception antenna system by using the phase error estimated by phase error estimator 111. For example, pre-stage phase noise compensator 112 estimates a phase rotation amount of the signal before the MIMO separation processing (for example, for each OFDM symbol), and compensates the CPE caused by the phase noise. In addition, in addition to the CPE compensation, pre-stage phase noise compensator 112 may perform ICI removal for removing ICI due to the phase noise.

MIMO reception processor 113 performs, for example, MIMO reception processing including channel equalization (or MIMO separation processing), and separates (or detect) the multiplexed stream signals. Note that, in a case where the MIMO transmission is not performed, the MIMO reception processor may perform the channel equalization and may not detect the stream signal. In addition, MIMO reception processor 113 may estimate channel (propagation path) variation by using the reference signal before the MIMO reception processing.

Post-stage phase noise compensator 114 performs phase noise compensation for each stream signal separated by MIMO reception processor 113, for example, by using the phase error estimated by phase error estimator 111. For example, post-stage phase noise compensator 114 estimates a phase rotation amount of the signal after the MIMO separation processing (for example, for each stream signal), and compensates the CPE caused by the phase noise. In addition, in addition to the CPE compensation, post-stage phase noise compensator 114 may perform ICI removal for removing ICI due to the phase noise.

Demodulator 115 converts, into a bit string, a modulation symbol modulated by a modulation scheme such as QPSK or 16 QAM.

Decoder 116 performs decoding processing of a bit string coded by a coding scheme such as LDPC coding.

Note that, kinds of processing in the units that perform the reception processing may be performed for each system of the plurality of antennas. In addition, each antenna system may process reception signals from different relay terminals or APs. In addition, processors such as wireless transmitters that perform kinds of processing of the antenna systems may be in an identical housing, or may be disposed in a distributed manner in different housings.

<Control Unit>

For example, control unit 117 determines information regarding whether or not the local oscillators used in the plurality of transmission antenna systems (for example, may be referred to as branches) of communication apparatus 100 are common between the plurality of transmission antenna systems or information regarding accuracy (or performance) of the local oscillator, and outputs, as control information, the information to encoder 101.

In addition, for example, information regarding whether or not a local oscillator of a reception antenna system of a communication partner (partner station) of communication apparatus 100 is common between the plurality of reception antenna systems or information regarding the accuracy (or performance) of the local oscillator is input as the control information from the decoder 116 to control unit 117.

Control unit 117 controls a PTRS generation method in PTRS generator 104 based on, for example, information regarding the local oscillator of the transmission antenna system of communication apparatus 100 and information regarding the local oscillator of the reception antenna system of the partner station.

For example, in a case where the local oscillator of the partner station is common between the reception antenna systems and the local oscillator of communication apparatus 100 is independent between the transmission antenna systems (for example, in a case where the local oscillators are not common), control unit 117 may instruct PTRS generator 104 to generate the PTRS for each of the plurality of streams.

In addition, for example, in a case where the local oscillator of the partner station is independent (for example, is not common) between the reception antenna systems and the local oscillator of communication apparatus 100 is common between the transmission antenna systems, control unit 117 may instruct PTRS generator 104 to generate a PTRS common to the plurality of (for example, all) streams.

In addition, for example, in a case where the local oscillator of the partner station is independent (for example, is not common) between the reception antenna systems and the local oscillator of communication apparatus 100 is independent between the transmission antenna systems (for example, in a case where the local oscillators are not common), control unit 117 may instruct PTRS generator 104 to generate both the PTRS common to all the streams and the PTRS for each stream.

Note that, an operation example of the PTRS generation will be described later.

In addition, control unit 117 controls a method for estimating the phase error in phase error estimator 111 based on, for example, information regarding the local oscillator of the transmission antenna system notified from the partner station and information regarding the local oscillator of the reception antenna system of communication apparatus 100.

For example, in a case where the local oscillator of the partner station is common between the transmission antenna systems and the local oscillator of communication apparatus 100 is independent between the reception antenna systems (for example, in a case where the local oscillator are not common), control unit 117 may control phase error estimator 111 to estimate the phase error for each reception antenna system by using the PTRS common to the plurality of (for example, all) streams.

In addition, for example, in a case where the local oscillator of the partner station is independent between the transmission antenna systems (for example, is not common) and the local oscillator of communication apparatus 100 is common between the reception antenna systems, control unit 117 may control phase error estimator 111 to estimate the phase error for each stream (or for each transmission antenna system of the partner station) by using the PTRS for each of the plurality of streams.

In addition, for example, in a case where the local oscillator of the partner station is independent between the transmission antenna systems (for example, is not common) and the local oscillator of communication apparatus 100 is independent between the reception antenna systems (for example, in a case where the local oscillators are not common), control unit 117 may control phase error estimator 111 to estimate the phase error for each of the reception antenna systems and the phase error for each of the streams by using both the PTRS common to the plurality of (for example, all) streams and the PTRS for each of the plurality of streams.

[Operation Example of Communication Apparatus]

Next, an operation example of communication apparatus 100 will be described.

Hereinafter, for example, an operation example (or a control method) of PTRS generation processing in communication apparatus 100 will be described.

For example, communication apparatus 100 may control the PTRS generation in PTRS generator 104 in accordance with a condition based on phase noises of the plurality of transmission antennas (for example, antennas 108 of communication apparatus 100) used for the MIMO transmission and phase noises of a plurality of reception antennas (for example, reception antennas of the partner station) used for the MIMO transmission. For example, communication apparatus 100 may determine the generation of one or both of the PTRS common to the plurality of streams of the MIMO transmission and the PTRS (for example, PTRSs orthogonal between streams) for each of the plurality of streams in accordance with the condition.

For example, communication apparatus 100 generates the PTRS common to the plurality of (for example, all) streams in the following cases.

Case where a phase noise is added to each MIMO reception antenna system of partner station Case where phase noises stronger than on the transmission side (for example, communication apparatus 100) are added on the reception side (for example, partner station) of the MIMO channel For example, communication apparatus 100 (for example, control unit 117) may control an operation of PTRS generator 104 based on at least one of information regarding whether or not the local oscillator used in the reception antenna system of the partner station is common between the reception antenna systems or information regarding the accuracy of the local oscillator.

For example, control unit 117 may receive (or retain) the information regarding whether or not the local oscillator used in the reception antenna system of the partner station is common and may perform control such that the information regarding the accuracy of the local oscillator and the PTRS common to the plurality of streams is generated in a case where the local oscillator is independent between the reception antenna systems of the partner station (or in a case where the local oscillator is not common). For example, PTRS generator 104 may generate the PTRS common to the plurality of streams in a case where different phase noises are added to the reception antenna systems of the partner station used for the MIMO transmission.

In addition, for example, in a case where the local oscillator of the partner station is independent between the plurality of reception antenna systems and the accuracy of the local oscillator is less than or equal to a predetermined level, control unit 117 may perform control such that the PTRS common to the plurality of streams is generated.

In addition, for example, control unit 117 may perform control such that the PTRS common to the plurality of streams is generated in a case where the phase noise in the reception antenna system of the partner station is stronger than the phase noise in the transmission antenna system of communication apparatus 100. The phase noise or the comparison (for example, magnitude) of the phase noise in the reception antenna system and the transmission antenna system may be estimated based on, for example, a frequency to be used (for example, whether or not the frequency is a terahertz wave or a millimeter wave), the presence or absence of use of the relay station (or the relay terminal), or the presence or absence of use of the distributed antenna (for example, usage status).

Note that, the reception antenna system may be, for example, a reception system including the relay apparatus or the distributed antenna, and communication apparatus 100 may use information on the local oscillator received from the relay apparatus or the distributed antenna apparatus (for example, radio unit (RU) or the like).

In addition, for example, communication apparatus 100 generates the PTRS for each of the plurality of streams in the following cases.

Case where a phase noise is added to each MIMO transmission antenna system of communication apparatus 100

Case where phase noises stronger than on the reception side (for example, partner station) are added on the transmission side (for example, communication apparatus 100) of the MIMO channel For example, communication apparatus 100 (for example, control unit 117) may control the operation of PTRS generator 104 based on at least one of the information regarding whether or not the local oscillator used in the transmission antenna system of communication apparatus 100 is common between the transmission antenna systems or the information regarding the accuracy of the local oscillator.

For example, control unit 117 may set, in advance, the information regarding whether or not the local oscillator used in the transmission antenna system of communication apparatus 100 is common or the information regarding the accuracy and may perform control such that the PTRS for each of the plurality of streams is generated in a case where the local oscillator is independent between the transmission antenna systems of communication apparatus 100 (or in a case where the local oscillator is not common). For example, PTRS generator 104 may generate the PTRS of each of the plurality of streams in a case where different phase noises are added to the transmission antenna systems of communication apparatus 100 used for the MIMO transmission.

In addition, for example, control unit 117 may perform control such that the PTRS for each of the plurality of streams is generated in a case where the local oscillator of communication apparatus 100 is independent between the plurality of transmission antenna systems and the accuracy of the local oscillator is less than or equal to a predetermined level.

In addition, for example, control unit 117 may perform control such that the PTRS for each of the plurality of streams is generated in a case where the phase noise in the transmission antenna system of communication apparatus 100 is stronger than the phase noise in the reception antenna system of the partner station. The phase noise or the comparison (for example, magnitude) of the phase noise in the reception antenna system and the transmission antenna system may be estimated based on, for example, a frequency to be used (for example, whether or not the frequency is a terahertz wave or a millimeter wave), the presence or absence of use of the relay station (or the relay terminal), or the presence or absence of use of the distributed antenna (for example, usage status).

In addition, for example, control unit 117 may determine whether to generate the PTRS common to the plurality of streams or the PTRS for each of the plurality of streams in accordance with a difference in accuracy (or a performance difference) between the local oscillator of the transmission antenna system of communication apparatus 100 and the local oscillator of the reception antenna system of the partner station.

Next, an example in which the virtualization terminal system and the distributed antenna system studied for the 6G will be described as an operation example of the communication system using communication apparatus 100 described above.

Figure 3A:
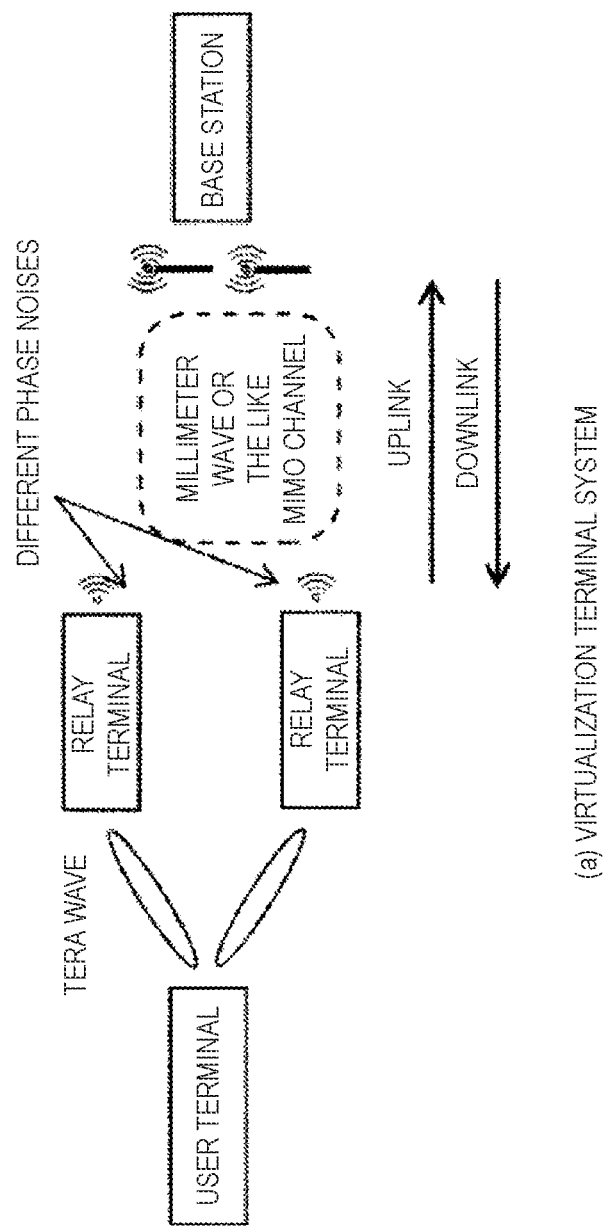
FIG. 3A is a diagram illustrating an example of a virtualization terminal system.

FIG. 3A illustrates a configuration example of the virtualization terminal system.

In the virtualization terminal system illustrated in FIG. 3A, a user terminal and the relay terminal are connected by a radio wave (for example, terahertz wave), and the user terminal and the relay terminal behave like one terminal apparatus. For example, the relay terminal is used as a remote antenna connected to the user terminal by a link using the radio wave (for example, terahertz wave or the like).

Here, in a case where each relay terminal is a transmission and reception antenna system of the terminal (for example, communication apparatus 100 in FIG. 2), each of the constituent elements related to the transmission processing of each antenna system in FIG. 2 processes a signal to a different relay terminal, and each of the constituent elements related to the reception processing of each antenna system in FIG. 2 processes a signal from a different relay terminal. Then, since each relay terminal is a transmission and reception antenna system of the terminal, the user terminal communicates with the base station by using the local oscillator independent (or not common) between the transmission antenna systems and between the reception antenna systems. On the other hand, in the example of FIG. 3A, the base station (for example, partner station of communication apparatus 100) uses the local oscillator common to two antennas.

Figure 3B:
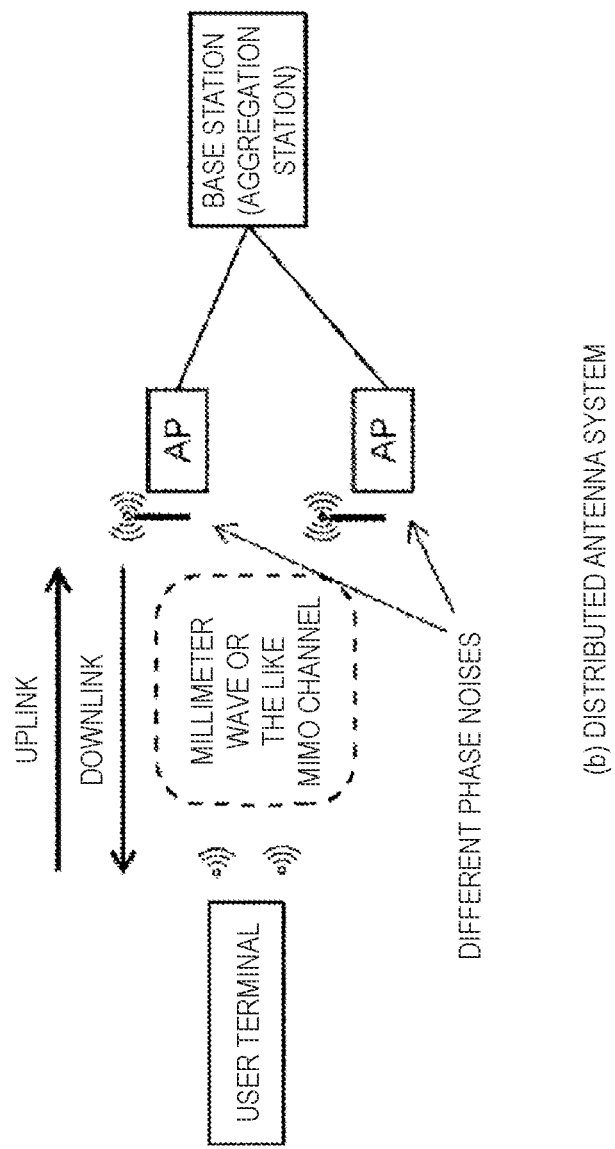
FIG. 3B is a diagram illustrating an example of a distributed antenna system.

FIG. 3B illustrates a configuration example of the distributed antenna system.

In the distributed antenna system illustrated in FIG. 3B, a plurality of APs or RUs disposed in a distributed manner are connected to the base station (for example, communication apparatus 100 in FIG. 2), and each AP or RU serves as a transmission and reception antenna system of the base station. For example, in FIG. 2, each of the constituent elements related to the transmission processing of each antenna system processes a signal to a different AP, and in FIG. 2, each of the constituent elements related to the reception processing of each antenna system processes a signal from a different AP. Then, since each AP is the transmission and reception antenna system of the base station, the base station performs communication with the terminal by using the local oscillator independent (not common) between the transmission antenna systems and between the reception antenna systems. On the other hand, in the example of FIG. 3B, the user terminal (for example, the partner station of communication apparatus 100) uses the local oscillator common to two antennas.

As described above, in an uplink of the virtualization terminal system of FIG. 3A and a downlink of the distributed antenna system illustrated in FIG. 3B, an independent phase noise may be generated for each transmission antenna system on the transmission side. In this case, the transmission signal is received through the MIMO channel (for example, radio propagation path between the plurality of antennas) after a phase noise is added to the transmission signal in each of the transmission antenna systems. Thus, in order to compensate the phase noise remaining for each transmission antenna system (or stream) after the MIMO reception processing (for example, MIMO stream separation) is performed on the reception side (for example, partner station), communication apparatus 100 (for example, transmission side) generates and transmits the PTRS for each of the plurality of streams. In addition, when the MIMO reception processing is performed, communication apparatus 100 (for example, reception side) obtains the transmission signal (stream) by performing the MIMO reception processing and then performing the phase noise compensation (for example, CPE compensation) on each stream by using the PTRS of each of the plurality of streams transmitted from the partner station (for example, transmission side).

In addition, in a downlink of the virtualization terminal system illustrated in FIG. 3A and an uplink of the distributed antenna system illustrated in FIG. 3B, an independent phase noise may be generated for each reception antenna system on the reception side. In this case, a phase noise is added to the transmission signal in each reception antenna system after the transmission signal passes through the MIMO channel. Thus, communication apparatus 100 (for example, transmission side) generates and transmits the PTRS common to the plurality of streams in order to compensate the phase noise for each reception antenna system on the reception side (for example, partner station). In addition, when the MIMO reception processing is performed, communication apparatus 100 (for example, reception side) obtains the transmission signal (stream) by performing the phase noise compensation (for example, CPE compensation) on the signal of each reception antenna system by using the PTRS common to the plurality of streams, which is transmitted from the partner station (for example, transmission side), and then performing the MIMO reception processing (MIMO stream separation) after the influence of the phase noise is reduced.

Note that, in a case where the local oscillator is independent for both the transmission antenna system and the reception antenna system in the uplink or the downlink, communication apparatus 100 may generate and transmit both the PTRS for each of the plurality of streams and the PTRS common to the plurality of streams.

Note that, the phase noise compensation may be CPE compensation, ICI removal, or both the CPE compensation and the ICI removal.

As described above, in the present exemplary embodiment, communication apparatus 100 controls the transmission of the PTRS in the plurality of streams of the MIMO transmission in accordance with the condition, and transmits the PTRS according to the control. For example, communication apparatus 100 may determine the generation of the PTRS for each of the plurality of streams and the PTRS common to the plurality of streams based on the phase noise of the transmission antenna used for the MIMO transmission and the phase noise of the reception antenna used for the MIMO transmission.

As a result, since communication apparatus 100 can transmit the PTRS that enables appropriate phase noise compensation corresponding to the transmission and reception or a status of the phase noise between the antenna systems, an error rate characteristic, a throughput characteristic, or coverage performance can be improved.

The exemplary embodiment of the present disclosure has been described above.

Note that, in the above exemplary embodiment, the stream may be referred to as a layer, a code word, or a code block.

In addition, in the above exemplary embodiment, although the example in which the PTRS generation is controlled in accordance with a phase noise level has been described, a parameter used in the control of the PTRS generation is not limited to the phase noise level.

For example, the PTRS generation may be controlled in accordance with a frequency band used for transmission and reception of a signal of MIMO communication. For example, in a case where the frequency used for the MIMO communication is higher than a predetermined value and the local oscillator is independent for each transmission antenna system, communication apparatus 100 may generate the PTRS for each stream.

In addition, in the above exemplary embodiment, although the example in which the generation of the PTRS is controlled based on whether or not the local oscillator is common between the antenna systems has been described, the present disclosure is not limited thereto, and for example, the PTRS generation may be controlled based on the presence or absence of the relay terminal.

For example, in the transmission from the user terminal to the base station (for example, uplink transmission), in a case where the relay terminal is used, the PTRS for each stream may be generated. In addition, in a case where the relay terminal performs conversion of a frequency to a high frequency, since a large phase noise is generated, communication apparatus 100 may generate the PTRS for each stream in a case where the relay terminal performs the frequency conversion.

In addition, for example, in a case where the relay terminal is used in transmission (for example, downlink transmission) from the base station to the user terminal, the PTRS common to the streams may be generated. In addition, in a case where the relay terminal performs the conversion of the frequency to the high frequency, since a large phase noise is generated, communication apparatus 100 may generate the PTRS common to the streams in a case where the relay terminal performs the frequency conversion.

In addition, in the above exemplary embodiment, although the example in which communication apparatus 100 receives notification of the information regarding the local oscillator from the partner station and controls the PTRS generation based on the notified information has been described, the notified information is not limited to the information regarding the local oscillator. For example, the information notified from the partner station may include information regarding the generation method of the PTRS (for example, information regarding necessity for the generation of the PTRS common to the streams and the generation of the PTRS for each stream). Communication apparatus 100 may generate the PTRS according to the notified information.

In addition, in a case where the PTRS common to the plurality of streams is generated, communication apparatus 100 may transmit the PTRS common to the plurality of streams from any one stream or antenna, or may transmit the PTRS common to the plurality of streams or antennas. In any case, the PTRS can be transmitted with a large power by using the PTRS common to the plurality of streams.

In addition, in the above exemplary embodiment, although the example in which the terahertz wave or the millimeter wave is used has been described, other frequency bands can also be applied.

In addition, in the above exemplary embodiment, although the case of the virtualization terminal or the distributed antenna system using the relay terminal has been described, the present disclosure can also be applied to a normal terminal or base station (for example, in which antennas are not disposed in a distributed manner).

In addition, the exemplary embodiment of the present disclosure can be applied not only to the phase noise but also to phase variation compensation caused by frequency deviation (frequency offset) with the communication partner according to a similar method.

In addition, in the examples of FIGS. 3A and 3B, although the case where different phase noises are generated between the plurality of antennas in any one of the user terminal and the base station has been described, the present disclosure is not limited thereto. For example, in a case where different phase noises are generated between the plurality of antennas in both the user terminal and the base station, communication apparatus 100 may generate both the PTRS common to the streams and the PTRS for each stream.

In addition, in communication apparatus 100 illustrated in FIG. 2, although the configuration in which the phase noise is compensated in the pre-stage and the post-stage of the MIMO separation processing (for example, MIMO reception processor 113) has been described, the configuration of communication apparatus 100 is not limited thereto. For example, communication apparatus 100 may be configured to compensate the phase noise in any one of the pre-stage and the post-stage of the MIMO separation processing, and not necessarily be configured to compensate the phase noise in the other stage.

In addition, in the above exemplary embodiment, although the case where the PTRS for each of the plurality of streams is generated has been described, the present disclosure is not limited thereto. For example, the PTRS for each group (one or a plurality of streams) including a part of the streams corresponding to the antennas to which the identical phase noise is added between the plurality of streams may be generated.

In addition, the millimeter wave band may be read as a frequency of "frequency range 2 (FR2)". In addition, the sub 6 GHz band may be read as a frequency of "frequency range 1 (FR1)".

In addition, the reference signal is not limited to the PTRS, and may be another signal. For example, the reference signal may be any of a demodulation reference signal (DMRS), a channel state information-reference signal (CSI-RS), a tracking reference signal (TRS), a cell-specific reference signal (CRS), and a sounding reference signal (SRS).

In addition, in the above exemplary embodiment, the notation " . . . unit" used for each component may be replaced with another notation such as " . . . circuit (circuitry)", " . . . device", or " . . . module".

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus. The communication apparatus may include a radio transceiver and a processing/control circuitry. The radio transceiver may include a receiver and a transmitter, or include receiving and transmitting functions. The radio transceiver (the transmitter and the receiver) may include a radio frequency (RF) module and one or more antennas. The RF module may include an amplifier, and an RF modulator and demodulator, or the like. Some non-limiting examples of such communication apparatus include a phone (e.g., cellular (cell) phone, smart phone), a tablet, a personal computer (PC) (e.g., laptop, desktop, notebook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A communication apparatus according to an exemplary embodiment of the present disclosure includes control circuitry that controls transmission of a reference signal for phase noise compensation in each of a plurality of streams of multiple-input multiple-output (MIMO) transmission in accordance with a condition, and transmission circuitry that transmits the reference signal according to the control.

In the exemplary embodiment of the present disclosure, the condition is based on phase noises of a plurality of transmission antennas used for the MIMO transmission and phase noises of a plurality of reception antennas used for the MIMO transmission, and the control circuitry transmits the reference signal for each of the plurality of streams in a case where different phase noises are added to the plurality of transmission antennas, and transmits the reference signal common to the plurality of streams in a case where different phase noises are added to the plurality of reception antennas.

In the exemplary embodiment of the present disclosure, the condition is based on comparison of phase noises in a plurality of transmission antennas used for the MIMO transmission with phase noises of a plurality of reception antennas used for the MIMO transmission, and the control circuitry transmits the reference signal of each of the plurality of streams in a case where the phase noises in the plurality of transmission antennas are stronger than the phase noises in the plurality of reception antennas, and transmits the reference signal common to the plurality of streams in a case where the phase noises in the plurality of reception antennas is stronger than the phase noises in the plurality of transmission antennas.

In the exemplary embodiment of the present disclosure, the condition is based on a usage status of at least one of a relay station in the communication apparatus and a communication partner of the communication apparatus, a frequency used for transmission and reception of the signal, or a distributed antenna used for the transmission and reception of the signal.

In the exemplary embodiment of the present disclosure, the condition is based on whether local oscillators are common or independent between a plurality of transmission antennas used for the MIMO transmission or a plurality of reception antennas used for the MIMO transmission.

In the exemplary embodiment of the present disclosure, the condition is based on a performance difference of a local oscillator between the communication apparatus and a communication partner of the communication apparatus.

In the exemplary embodiment of the present disclosure, the condition is based on information regarding a generation method of the reference signal received from a communication partner of the communication apparatus.

A communication method in a communication apparatus according to an exemplary embodiment of the present disclosure includes transmitting a reference signal for phase noise compensation in each of a plurality of streams of multiple-input multiple-output (MIMO) transmission in accordance with a condition, and transmitting the reference signal according to the control.

One aspect of the present disclosure is useful for a wireless communication system.

What is claimed is:

1. A communication apparatus comprising:
   control circuitry which, in operation, controls transmission of a reference signal for phase noise compensation in each of a plurality of streams of multiple-input multiple-output (MIMO) transmission in accordance with a condition; and
   transmission circuitry which, in operation, transmits the reference signal according to the control, wherein,
   the condition is based on phase noises of a plurality of transmission antennas used for the MIMO transmission and phase noises of a plurality of reception antennas used for the MIMO transmission, and the control circuitry transmits the reference signal for each of the plurality of streams in a case where different phase noises are added to the plurality of transmission antennas, and transmits the reference signal common to the plurality of streams in a case where different phase noises are added to the plurality of reception antennas.

2. A communication apparatus comprising:

control circuitry which, in operation, controls transmission of a reference signal for phase noise compensation in each of a plurality of streams of multiple-input multiple-output (MIMO) transmission in accordance with a condition; and transmission circuitry which, in operation, transmits the reference signal according to the control, wherein, the condition is based on comparison of phase noises in a plurality of transmission antennas used for the MIMO transmission with phase noises of a plurality of reception antennas used for the MIMO transmission, and the control circuitry transmits the reference signal of each of the plurality of streams in a case where the phase noises in the plurality of transmission antennas are stronger than the phase noises in the plurality of reception antennas, and transmits the reference signal common to the plurality of streams in a case where the phase noises in the plurality of reception antennas is stronger than the phase noises in the plurality of transmission antennas.

3. A communication method in a communication apparatus, comprising:

controlling transmission of a reference signal for phase noise compensation in each of a plurality of streams of multiple-input multiple-output (MIMO) transmission in accordance with a condition; and transmitting the reference signal according to the controlling, wherein, the condition is based on phase noises of a plurality of transmission antennas used for the MIMO transmission and phase noises of a plurality of reception antennas used for the MIMO transmission, and the controlling includes controlling the transmission of the reference signal for each of the plurality of streams in a case where different phase noises are added to the plurality of transmission antennas, and controlling the transmission of the reference signal common to the plurality of streams in a case where different phase noises are added to the plurality of reception antennas.

4. A communication method in a communication apparatus, comprising:

controlling transmission of a reference signal for phase noise compensation in each of a plurality of streams of multiple-input multiple-output (MIMO) transmission in accordance with a condition; and transmitting the reference signal according to the controlling, wherein, the condition is based on comparison of phase noises in a plurality of transmission antennas used for the MIMO transmission with phase noises of a plurality of reception antennas used for the MIMO transmission, and the controlling includes controlling the transmission of the reference signal of each of the plurality of streams in a case where the phase noises in the plurality of transmission antennas are stronger than the phase noises in the plurality of reception antennas, and controlling the transmission of the reference signal common to the plurality of streams in a case where the phase noises in the plurality of reception antennas is stronger than the phase noises in the plurality of transmission antennas.

* * * * *